US011636390B2

(12) United States Patent
Ranco et al.

(10) Patent No.: US 11,636,390 B2
(45) Date of Patent: Apr. 25, 2023

(54) GENERATING QUANTITATIVELY ASSESSED SYNTHETIC TRAINING DATA

(71) Applicant: International Business Machines Corporation, Armonk, NY (US)

(72) Inventors: Gabriele Ranco, Dublin (IE); Moises Noe Sanchez Garcia, Dublin (IE); Gordon Doyle, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 399 days.

(21) Appl. No.: 16/823,772

(22) Filed: Mar. 19, 2020

(65) Prior Publication Data

US 2021/0295205 A1    Sep. 23, 2021

(51) Int. Cl.
*G06N 20/00* (2019.01)
*G06K 9/62* (2022.01)
*G06F 17/16* (2006.01)
*G06F 17/18* (2006.01)

(52) U.S. Cl.
CPC .............. *G06N 20/00* (2019.01); *G06F 17/16* (2013.01); *G06F 17/18* (2013.01); *G06K 9/6256* (2013.01); *G06K 9/6267* (2013.01)

(58) Field of Classification Search
CPC ........ G06N 20/00; G06N 20/20; G06N 20/10; G06N 3/088; G06N 3/0445; G06N 3/0454; G06N 5/003; G06F 17/16; G06F 17/18; G06K 9/6256; G06K 9/6267
See application file for complete search history.

(56) References Cited

U.S. PATENT DOCUMENTS

| | | | | | |
|---|---|---|---|---|---|
| 7,299,135 | B2* | 11/2007 | Thayer | ................. | G06K 9/6226 |
| | | | | | 702/21 |
| 10,013,477 | B2* | 7/2018 | Ye | ......................... | G06F 16/285 |
| 10,339,177 | B2* | 7/2019 | Tang | .................... | G06V 40/172 |
| 10,445,879 | B1* | 10/2019 | Fuchs | .................... | G06K 9/623 |
| 10,810,736 | B2* | 10/2020 | Fuchs | .................... | G06T 7/0012 |
| 11,281,686 | B2* | 3/2022 | Dhaka | .................... | G06N 7/005 |
| 2007/0118297 | A1* | 5/2007 | Thayer | ................... | G16H 50/20 |
| | | | | | 702/21 |
| 2008/0133434 | A1* | 6/2008 | Asar | ...................... | G06N 20/10 |
| | | | | | 706/12 |

(Continued)

OTHER PUBLICATIONS

Petra Schneider (Hyperparameter learning in probabilistic prototype-based models, Neurocomputing 73(2010)1117-1124) (Year: 2010).*

(Continued)

*Primary Examiner* — Tung S Lau
(74) *Attorney, Agent, or Firm* — Randy E. Tejeda

(57) ABSTRACT

In an approach to generating quantitatively assessed synthetic training data, one or more computer processors identify an initial plurality of clusters in a dataset utilizing a trained classification model and a plurality of associated hyperparameters, wherein the clusters have sufficient density to be represented in a calculated probability distribution. The one or more computer processors generate one or more synthetic data points for each identified cluster utilizing a corresponding calculated probability distribution. The one or more computer processors quantitatively assess the one or more generated synthetic data points.

20 Claims, 4 Drawing Sheets

(56) References Cited

U.S. PATENT DOCUMENTS

| | | | |
|---|---|---|---|
| 2010/0174670 A1* | 7/2010 | Malik | G06F 16/35 706/12 |
| 2012/0330880 A1 | 12/2012 | Arasu | |
| 2013/0013233 A1 | 1/2013 | Murakami | |
| 2015/0379430 A1 | 12/2015 | Dirac | |
| 2017/0031953 A1* | 2/2017 | Tang | G06K 9/6232 |
| 2017/0083608 A1* | 3/2017 | Ye | G06N 20/10 |
| 2017/0185904 A1 | 6/2017 | Padmanabhan | |
| 2018/0189664 A1* | 7/2018 | Hegde | G06F 9/542 |
| 2019/0042887 A1 | 2/2019 | Nguyen | |
| 2019/0163666 A1 | 5/2019 | Cakmak | |
| 2021/0182631 A1* | 6/2021 | Baker | G06N 20/10 |
| 2021/0192381 A1* | 6/2021 | Ijaz | G06N 3/0454 |
| 2021/0295191 A1* | 9/2021 | Bui | G06K 9/6262 |

OTHER PUBLICATIONS

Gauvain et al., "Maximum a Posteriori Estimation for Multivariate Gaussian Mixture Observations of Markov Chains", IEEE Transaciions on Speech and Audio Processing. vol. 2, No. 2, Apr. 1994, 9 pages.

Mitchell, Tom M., "The Discipline of Machine Learning", Jul. 2006, School of Computer Science, Carnegie Mellon University, Pittsburgh, PA 15213, 9 pages.

Rasmussen, Carl Edward, "Gaussian Processes in Machine Learning", Max Planck Institute for Biological Cybernetics, 72076 Tubingen, Germany, Printed Mar. 4, 2020, 9 pages.

Saxena et al., "A Review of Clustering Techniques and Developments", Accepted Manuscript, Printed Mar. 4, 2020, 33 pages.

Wigglesworth, Robin, "Fintech: Search for a super-algo", Jan. 20, 2016, 2 pages, <https://www.ft.com/content/5eb91614-bee5-11e5-846f-79b0e3d20eaf>.

* cited by examiner

GENERATING QUANTITATIVELY ASSESSED SYNTHETIC TRAINING DATA

BACKGROUND

The present invention relates generally to the field of machine learning, and more particularly to generating synthetic data.

Normal distributions are often used in the natural and social sciences to represent real-valued random variables whose distributions are not known. The value of normal distributions is partly due to the central limit theorem, which states that under some conditions, the average of many samples (observations) of a random variable with finite mean and variance is itself a random variable whose distribution converges to a normal distribution as the number of samples increases. Therefore, physical quantities that are expected to be the sum of many independent processes (such as measurement errors) often have distributions that are nearly normal.

A normal, Gaussian, Gauss, or Laplace-Gauss distribution is a type of continuous probability distribution for a real-valued random variable. A random variable with a Gaussian distribution is said to be normally distributed and is called a normal deviate. Moreover, Gaussian distributions have unique properties that are valuable in analytic studies. For instance, any linear combination of a fixed collection of normal deviates is a normal deviate. Many results and methods (such as propagation of uncertainty and least squares parameter fitting) can be derived analytically in explicit form when the relevant variables are normally distributed.

SUMMARY

Embodiments of the present invention disclose a computer-implemented method, a computer program product, and a system for generating quantitatively assessed synthetic training data. The computer-implemented method includes one or more computer processers identifying an initial plurality of clusters in a dataset utilizing a trained classification model and a plurality of associated hyperparameters, wherein the clusters have sufficient density to be represented in a calculated probability distribution. The one or more computer processors generate one or more synthetic data points for each identified cluster utilizing a corresponding calculated probability distribution. The one or more computer processors quantitatively assess the one or more generated synthetic data points.

DETAILED DESCRIPTION

Rapid development of machine learning models is a critical aspect of many industries, but a significant constraint of rapid development is limited training datasets and data points. The efficient creation of cognitive solutions requires enabling big data pipelines and automating access of data that is transformed and correlated in a model trained and tested for performance. The internal architecture of the models combined with data are the main two elements and drivers of model and application performance. Increased speed in developing accurate machine learning models utilizing large amounts of data has demonstrated a clear advantage in several industrial sectors but significant issues arise when data is not available in a sufficient quantity (e.g., training sets that result in an accurate model). Said issues thereby cause significant delays in the training and testing of machine learning models and subsequently delay the deployment and application of the models.

Embodiments of the present invention generate large amounts (e.g., at least meeting a lower bound of a Vapnik-Chervoenkis (VC) dimension) of data required to avoid interruptions in the development of machine learning models. Embodiments of the present invention provide development teams consistent access (e.g., 99% data accessibility) to usable data resources while avoiding strategic constraints caused by a training data. Embodiments of the present invention generate synthetic data while assessing relevant statistical properties (e.g., covariance matrices, probability distributions, etc.) and creating statistical assumptions from a small input dataset. Embodiments of the present invention generate synthetic data utilizing a gaussian distribution. Embodiments of the present invention automatically generate and quantitatively assess synthetic data for statistical correctness utilizing a combined clustering and binary classifier approach. Embodiments of the present invention utilize generated synthetic data to build an initial machine learning model comprising a model architecture (e.g., weights, connections, etc.) can be further fine-tuned based on model performance and statistics. Embodiments of the present invention recognize that greater data insight is obtained through the generation of synthetic data. Embodiments of the present invention recognize that dynamically providing data in machine learning model pipelines significantly enhances pipeline performance and efficiency. Implementation of embodiments of the invention may take a variety of forms, and exemplary implementation details are discussed subsequently with reference to the Figures.

The present invention will now be described in detail with reference to the Figures.

Figure 1:
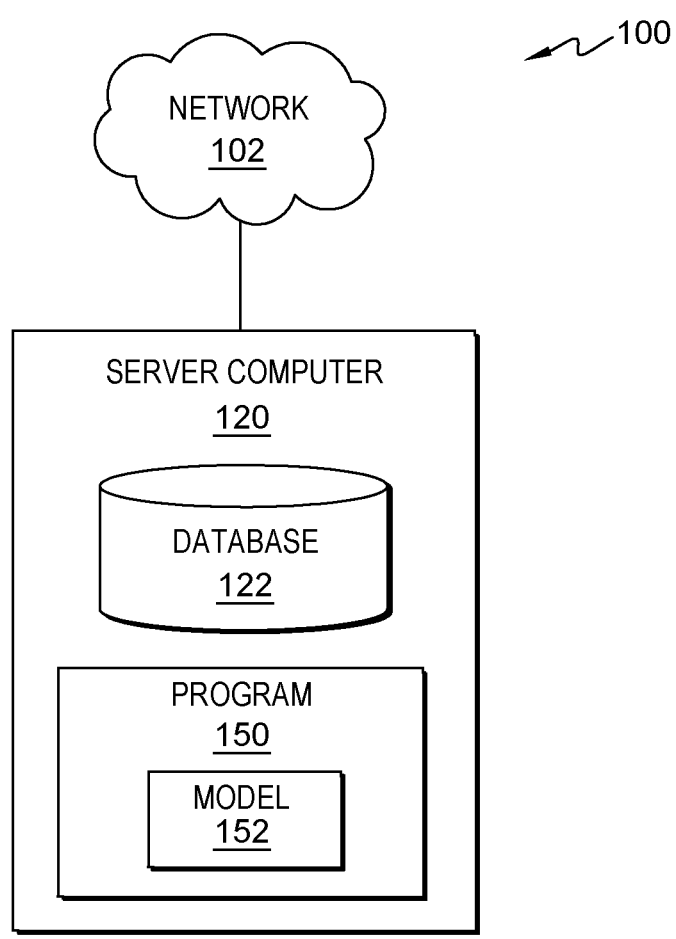
FIG. 1 is a functional block diagram illustrating a computational environment, in accordance with an embodiment of the present invention.

FIG. 1 is a functional block diagram illustrating a computational environment, generally designated 100, in accordance with one embodiment of the present invention. The term "computational" as used in this specification describes a computer system that includes multiple, physically, distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Computational environment 100 includes server computer 120 connected over network 102. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks that are capable of receiving and transmitting data, voice, and/or video signals, including multimedia signals that include voice, data, and video information. In general, network 102 can be any combination of connections and protocols that will support communications between server computer 120, and other computing devices (not shown) within computational environment 100. In various embodiments, network 102 operates locally via wired, wireless, or optical connections and can be any combination of connections and protocols (e.g., personal area network (PAN), near field communication (NFC), laser, infrared, ultrasonic, etc.).

Server computer 120 can be a standalone computing device, a management server, a web server, a mobile computing device, or any other electronic device or computing system capable of receiving, sending, and processing data. In other embodiments, server computer 120 can represent a server computing system utilizing multiple computers as a server system, such as in a cloud computing environment. In another embodiment, server computer 120 can be a laptop computer, a tablet computer, a netbook computer, a personal computer (PC), a desktop computer, a personal digital assistant (PDA), a smart phone, or any programmable electronic device capable of communicating with other computing devices (not shown) within computational environment 100 via network 102. In another embodiment, server computer 120 represents a computing system utilizing clustered computers and components (e.g., database server computers, application server computers, etc.) that act as a single pool of seamless resources when accessed within computational environment 100. In the depicted embodiment, server computer 120 includes database 122 and program 150. In other embodiments, server computer 120 may contain other applications, databases, programs, etc. which have not been depicted in computational environment 100. Server computer 120 may include internal and external hardware components, as depicted, and described in further detail with respect to FIG. 3.

Database 122 is a repository for data used by program 150. In the depicted embodiment, database 122 resides on server computer 120. In another embodiment, database 122 may reside elsewhere within computational environment 100 provided program 150 has access to database 122. A database is an organized collection of data. Database 122 can be implemented with any type of storage device capable of storing data and configuration files that can be accessed and utilized by program 150, such as a database server, a hard disk drive, or a flash memory. In an embodiment, database 122 stores data used by program 150 such as datasets, data points, sets of training data (i.e., training data), data structures, and/or variables used to fit the parameters or hyperparameters of a model. In an embodiment, database 122 may contain one or more sets containing a plurality of unclassified or classified (e.g., labelled) data, hereinafter referred to as data points or a dataset (e.g., training statements). In another embodiment, a dataset contains an array of training statements organized in labelled training sets. For example, a dataset includes "real" and "synthetic" labels paired with associated data points. In an embodiment, each training set includes a label and an associated array or set of data points utilized to train one or more models.

Model 152 is representative of a model utilizing machine learning algorithms and models. In an embodiment, model 152 is comprised of any combination of machine learning and deep learning techniques and algorithms (e.g., binary classifiers, decision trees, Naive Bayes classification, support vector machines for classification problems, random forest for classification and regression, linear regression, least squares regression, logistic regression). In an embodiment, model 152 utilizes transferrable neural networks algorithms and models (e.g., long short-term memory (LSTM), deep stacking network (DSN), deep belief network (DBN), convolutional neural networks (CNN), compound hierarchical deep models, etc.) that can be trained with supervised or unsupervised methods. In the depicted embodiment, model 152 is a recurrent neural network (RNN) trained utilizing supervised training methods. The training of model 152 is depicted and described in further detail with respect to FIG. 2.

Program 150 is a program for generating quantitatively assessed synthetic training data. In various embodiments, program 150 may implement the following steps: identify an initial plurality of clusters in a dataset utilizing a trained classification model and a plurality of associated hyperparameters, wherein the clusters have sufficient density to be represented in a calculated probability distribution; generate one or more synthetic data points for each identified cluster utilizing a corresponding calculated probability distribution; quantitatively assess the one or more generated synthetic data points. In the depicted embodiment, program 150 is a standalone software program. In another embodiment, the functionality of program 150, or any combination programs thereof, may be integrated into a single software program. In some embodiments, program 150 may be located on separate computing devices (not depicted) but can still communicate over network 102. In various embodiments, client versions of program 150 resides on any other computing device (not depicted) within computational environment 100. Program 150 is depicted and described in further detail with respect to FIG. 2.

The present invention may contain various accessible data sources, such as database 122, that may include personal storage devices, data, content, or information the user wishes not to be processed. Processing refers to any, automated or unautomated, operation or set of operations such as collection, recording, organization, structuring, storage, adaptation, alteration, retrieval, consultation, use, disclosure by transmission, dissemination, or otherwise making available, combination, restriction, erasure, or destruction performed on personal data. Program 150 provides informed consent, with notice of the collection of personal data, allowing the user to opt in or opt out of processing personal data. Consent can take several forms. Opt-in consent can impose on the user to take an affirmative action before the personal data is processed. Alternatively, opt-out consent can impose on the user to take an affirmative action to prevent the processing of personal data before the data is processed. Program 150 enables the authorized and secure processing of user information, such as tracking information, as well as personal data, such as personally identifying information or sensitive personal information. Program 150 provides information regarding the personal data and the nature (e.g., type, scope, purpose, duration, etc.) of the processing. Program 150 provides the user with copies of stored personal data. Program 150 allows the correction or completion of incorrect or incomplete personal data. Program 150 allows the immediate deletion of personal data.

Figure 2:
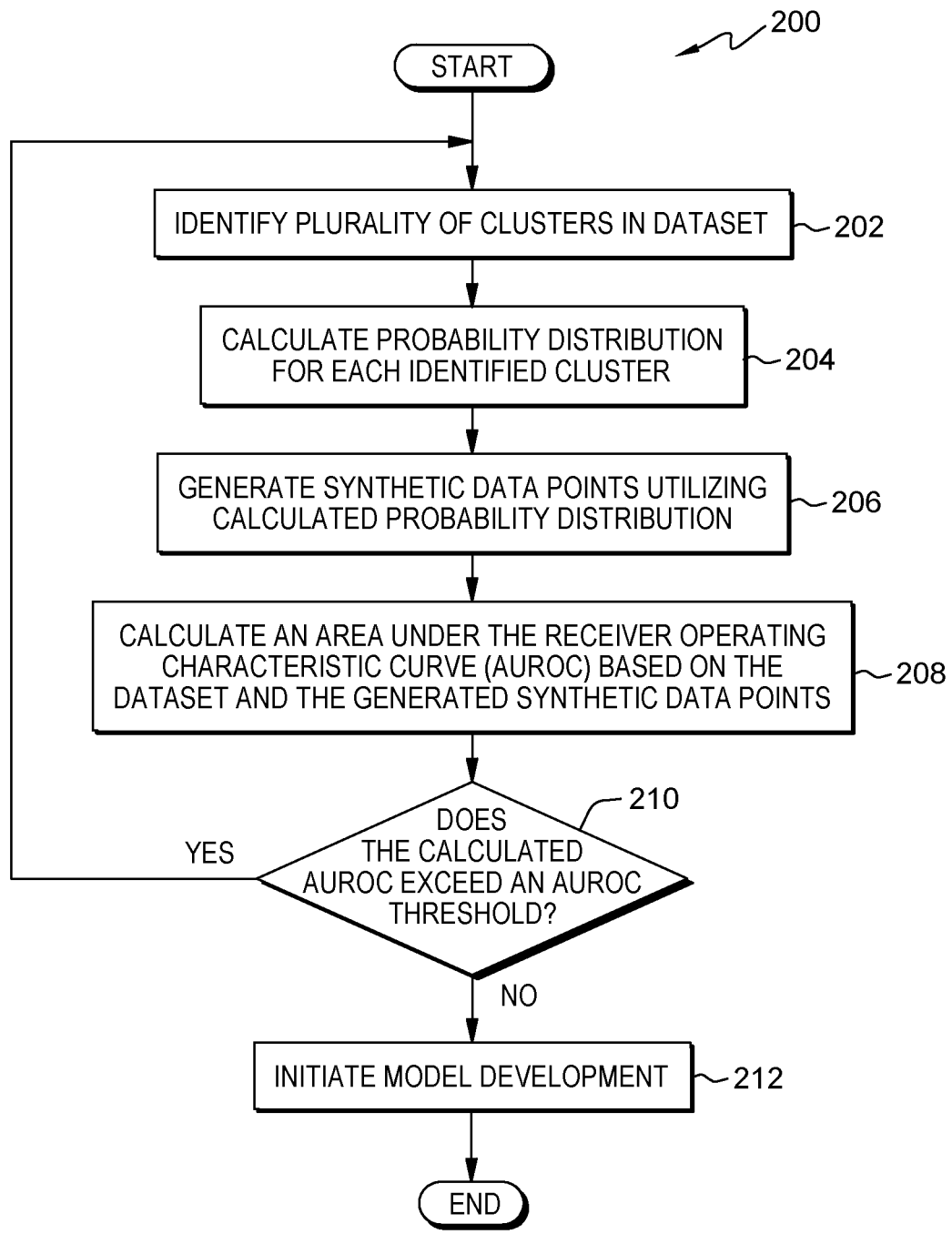
FIG. 2 is a flowchart depicting operational steps of a program, on a server computer within the computational environment of FIG. 1, for generating quantitatively assessed synthetic training data, in accordance with an embodiment of the present invention.

FIG. 2 is a flowchart depicting operational steps of program 150 for generating quantitatively assessed synthetic training data, in accordance with an embodiment of the present invention.

Program 150 identifies a plurality of clusters in a dataset (step 202). In various embodiments, program 150 initiates, starts, or commences upon an initiation of an associated machine learning development pipeline. In another embodiment, program 150 initiates by user request, by a user submitting or inputting the dataset (i.e., initial data set). In an embodiment, program 150 retrieves a dataset from a plurality of sources such as repositories, local storage, etc. For example, program 150 retrieves the dataset contained in a collected file or data queried from an online corpus (e.g., private cloud, or database server (e.g., database 122). The dataset includes real (e.g., real-world information, observed information, etc.) data points (i.e., instances, records, discrete units of information, etc.) that are either classified or unclassified (i.e., grouped, clustered, labelled, etc.). In an embodiment, program 150 aggregates (e.g., clusters, pools, groups, bands, pairs, etc.) a dataset across a plurality of instance labels associated with one or more data points. For example, program 150 aggregates data points utilizing a plurality of associated with the plurality of instances labels.

Responsive to an absence of instances (i.e., data points have no associated labels, unclassified, etc.) or a plurality of highly overlapping clusters (i.e., classes), program 150 utilizes one or more clustering models and/or algorithms (e.g., binary classifiers, multi-class classifiers, multi-label classifiers, Naïve Bayes, k-nearest neighbors, random forest, etc.) to generate a plurality of instance labels and aggregate the dataset based on the generated instance labels. In an embodiment, program 150 utilizes a classification model to identify and assign a label to a plurality of data points. For example, program 150 trains a neural network to identify the plurality of clusters. In this embodiment, program 150 fine-tunes the hyper-parameters of the classification model or classifier to identify well-defined clusters with sufficient density (e.g., clusters conforming to the central limit theorem) to be represented in a probability distribution as detailed in step 204.

Program 150 calculates a probability distribution for each identified cluster (step 204). Program 150 calculates a probability distribution for each instance label, class, or cluster identified in step 202 utilizing associated data points. For example, program 150 calculates a multivariate Gaussian distribution representing real-valued random variables, where the average of many samples of a random variable with finite mean and variance is a random variable that has a distribution converging to a normal distribution as the number of samples increases. In an embodiment, program 150 calculates a mean vector for each label in the plurality of instance labels. In a further embodiment, program 150 generates a covariance matrix based on the aggregated instance labels and associated data points, where the covariance matrix represents random variable (i.e., data point) variation. In a further embodiment, program 150 utilizes the statistics (e.g., mean and covariance matrices) generated above to calculate the probability distribution (e.g., Gaussian).

Program 150 generates synthetic data points utilizing the calculated probability distribution (step 206). Program 150 utilizes statistical parameters contained in the calculated probability distribution, as detailed in step 204, to generate one or more synthetic data points that are indistinguishable from real data points. For example, program 150 generates N synthetic data points for each of the identified clusters of real data points utilizing a corresponding probability distribution. In an embodiment, program 150 generates a plurality of synthetic data points utilizing a corresponding multivariate Gaussian distribution described by the mean vector and covariance matrix calculated in step 204. In an embodiment, program 150 determines a number of synthetic data points to generate based on initial dataset size and a machine learning model purpose (e.g., image classification, logistic regression, neural network) and associated operability of the machine learning pipeline. For example, program 150 generates 50,000 synthetic data based on an initial 15,000 real data points for a basic neural network model utilized to predict housing values.

Responsive to program 150 generating one or more synthetic data points, program 150 assigns a "true" (i.e., real) label to existing real data points (e.g., contained in the retrieved dataset) and a "false" (i.e., synthetic) label to generated synthetic data points. In an embodiment, generated synthetic data points contain similar statistical characteristics as a real data point. In various embodiments, program 150 creates a plurality of data subsets containing a plurality of mixed (i.e., real and synthetic) data points with corresponding instance labels. In the depicted embodiment, program 150 utilizes parameters from a calculated Gaussian distribution to create highly accurate synthetic data points. The structural and statistical characteristics of the synthetic data generated would be representative enough of the real data for the.

Program 150 calculates an area under the receiver operating characteristics curve (AUROC) utilizing the dataset and the generated synthetic data points (step 208). Program 150 calculates an AUROC utilizing results from a trained binary classifier. In an embodiment, program 150 creates and trains the binary classifier utilizing supervised training. In this embodiment, program 150 utilizes the created mixed data subsets, as described in step 206, and corresponding real instance labels and synthetic instance labels to train the binary classifier. Program 150 utilizes the trained binary classifier to predict whether a data point is real or synthetic where the binary classifier performance decreases as synthetic data points become increasingly statistically indistinguishable. In this embodiment, program 150 utilizes binary classifier performance (e.g., poor (e.g., performance no greater than random guessing)) as a quantified measurement of generated synthetic data point generation and application. For example, poor binary classifier performance is associated with a high level of synthetic data point accuracy and precision. In an embodiment, program 150 calculates a receiver operating characteristic curve (ROC) representing the performance of the binary classifier (i.e., classification model). The calculated ROC utilizes two parameters generated from the binary classifier; true positive rate and false positive rate. Responsive to program 150 calculating the ROC, program 150 calculates an area under the ROC curve (AUC). In an embodiment, program 150 utilizes the calculated AUC as an aggregate measure of performance across all possible classification thresholds. In another embodiment, program 150 utilizes the calculated AUC as the probability that the model (e.g., binary classifier) classifies a random real data point more highly than a random synthetic data point.

If the calculated area under the receiver operating characteristics curve (AUROC) exceeds an AUROC threshold ("yes" branch, decision block 210), then program 150 identifies a plurality of clusters in a dataset (step 202). For example, program 150 determines that the calculated AUROC exceeds an AUROC threshold of 0.6 and program 150 rejects one or more statistical assumptions associated with the cluster identified from the dataset and statistically inconsistent generated synthetic data points and produces (i.e., identifies) new (i.e., subsequent) clusters based on the initial data set containing real data points. In an embodiment, program 150 iteratively repeats the procedure detailed in steps 202, 204, 206, and 208. In an embodiment, program 150 identifies a plurality of new clusters in the dataset, as described in step 202. In an embodiment, program 150 calculates a probability distribution for each identified cluster, as described in step 204. In an embodiment, program 150 generates one or more synthetic data points utilizing a calculated probability distribution, as described in step 206. In an embodiment, program 150 calculates an AUROC based on the dataset and the generated synthetic data points, as described in step 208. In an embodiment, program 150 determines whether the calculated AUROC exceeds the AUROC threshold, as described in decision block 210.

Responsive to program 150 returning to step 202, program 150 adjusts or fine-tunes one or more hyperparameters associated with the trained classification model associated with the initial cluster identification. For example, program 150 adjusts hyperparameters associated with the clustering model or algorithm utilized for the previously identified clusters. Program 150 utilizes the adjusted hyperparameters and associated models to identify a plurality of clusters in the data set, as detailed in step 202. In various embodiments, program 150 adjusts hyperparameters based on the number of: leaves or depth of a tree, learning rate, hidden layers in a neural network, and/or the number of clusters. For example, if program 150 increases the number of identified clusters in step 202 and then program 150 adjusts one or more associated hyperparameters reflecting the cluster increase. In the above embodiments, program 150 iteratively quantitatively assesses the generated synthetic data points to ensure statistical consistency and accuracy through the utilization of the calculated AUROC and corresponding threshold.

If the calculated AUROC does not exceed an AUROC threshold, then program 150 ("no" branch, decision block 210), program 150 initiates a model development (step 212). For example, program 150 determines that the calculated AUROC does not exceed an AUROC threshold of 0.6 and program 150 accepts the generated synthetic data points as statistically consistent as compared to the initial dataset and initiates machine learning pipeline and model development (step 212). Program 150 utilizes generated synthetic data and real data points in a machine learning pipeline to initiate model development regardless of an initial dataset size. Program 150 creates, initiates, trains, and deploys one or more machine learning models utilizing the initial dataset and generated synthetic data points. In an embodiment, program 150 manages (i.e., facilitating correct storage, querying, and fetching of the training data) a development pipeline of one or more machine learning models based on a level of correctness associated with the generated synthetic data points allowing program 150 to implement an initial model architecture that allows the real-time ingesting of subsequently generated data points and new real data points. In an embodiment, program 150 controls further generation of synthetic data points based on statistical (i.e., Gaussian) assumptions and associated synthetic data point performance levels.

In an embodiment, responsive to a completed training, program 150 deploys the trained model to a plurality of environments such as production, testing, auxiliary, servers and applications. In an embodiment, a user instructs program 150 to deploy the trained model to a specific environment. In another embodiment, a targeted environment is predetermined or associated with the model. In another embodiment, responsive to program 150 deploying one or more trained models, program 150 utilizes the deployed model to cluster or classify one or more subsequent data points (e.g., real or synthetic) or datasets. In another embodiment, program 150 replaces an existing deployed model with one or more trained models as synthetic data points are generated, allowing program 150 to dynamically incorporate synthetic data points and incorporate subsequent models into existing applications as highly accurate models are trained. In an example scenario, an original dataset contains an insufficient (i.e., incapable of supporting an accurate model) amount of real data points representing a national housing market (e.g., due to the scope of the problem a large data set is required). In this scenario, if program 150 only utilized the original dataset, the resulting model would suffer from low accuracy and precision due to overfitting and underfitting caused by the insufficient dataset (i.e., low training statements). In this scenario, program 150 generates synthetic housing market data points bolstering the amount of data in the original dataset, allowing program 150 to train a more accurate model than possible with just the original data set. Further, program 150 continues to generate synthetic data points, retraining one or more models based on continuously generated synthetic data points, and redeploying the retrained models.

Further Comments and/or Embodiments

Some embodiments of the present invention recognize the following facts, potential problems, and/or potential areas for improvement with respect to the current state of the art.

The increased speed in developing accurate machine learning models using large amounts of data has shown a clear advantage in several industrial sectors. Some embodiments of the present invention recognize that a problem arises when such data is not available in a timely manner causing significant delays in the training and testing of these machine learning algorithms; delaying the delivery of such complex to build and fine tune algorithms. Some embodiments of the present invention generate the large amount of data required to avoid interruptions in the development of such machine learning models. Some embodiments of the present invention provide the possibility to development teams to have consistent access to usable data resources while avoiding legal, strategic, or other constraints caused by a lack of accessible real datasets in big data. Some embodiments of the present invention allow for the generation of synthetic data involves considering the relevant statistical properties to make useful assumptions from a small sample data input. The synthetic data, with a gaussian distribution, is automatically generated and quantitatively assessed in its statistical correctness using a combined clustering and binary classifier approach.

Some embodiments of the present invention recognize that the information technology market is showing every year more interest towards the application of machine learning models in order to build cognitive solutions useful in several industrial fields. Some embodiments of the present invention that building these solutions requires enabling big data pipelines to automate the access of sequences of data to be transformed and correlated together in a model that can be trained and tested for performance. Some embodiments of the present invention recognize that the internal architecture of the models together with the data are the main two elements and drivers of the behavior and therefore performance of the machines Some embodiments of the present invention generate synthetic data based on the combined usage of clustering and classification for an automated assessment of the correctness level of the synthetic data generated for usage in the development of machine learning models. Some embodiments of the present invention recognize that the generation of correct enough synthetic data depends exclusively on properly fine-tuning the hyper-parameters of a clustering algorithm. Some embodiments of the present invention recognize that when provided with well-defined clusters, the performance of the binary classifier is expected to decrease considerably as it will be harder to distinguish the real from the synthetic data instances. Some embodiments of the present invention recognize that a binary classifier with such a low level of performance is a quantified measurement of the correctness of the synthetic data generated.

Some embodiments of the present invention recognize that then well-defined clusters with enough density are found in the data, these can be better described by a gaussian model. Some embodiments of the present invention recognize that therefore the synthetic instances generated based on the parameters of the gaussian models for each cluster would tend to be more correct and generate the binary classifiers to have more difficulties in distinguishing between the real (True) and synthetic (False) data instances.

Some embodiments of the present invention generated synthetic data containing similar statistical characteristics to a real data sample. Some embodiments of the present invention recognize that this is enough to assist in the development of machine learning models by providing consistent access to data with a useful level of integrity associated. Some embodiments of the present invention recognize that the integrity of the data is achieved by means of a fully automated process that avoids human and transfer errors, and other related issues such as the presence of bugs and viruses as this data can be generated in a fully controlled manner. Some embodiments of the present invention facilitate correctly storing, querying, and fetching the data during the development pipeline of the machine learning models. Some embodiments of the present invention recognize that the input format and gaussian based representation of the data, captured by a binary classifier, for the generation of the synthetic data. Some embodiments of the present invention recognize that the structural and statistical characteristics of the synthetic data generated would be representative enough of the real data for the purposes of enabling the operability of the machine learning pipeline. Some embodiments of the present invention recognize that given the enabled operability of the pipeline, the development of the machine learning models can progress based on the correctness of the synthetic data, which will allow the building of an initial architecture able to ingest real-data, when made available.

In some embodiments of the present invention the generation of synthetic data can help the process of building machine learning models in three ways. Firstly, in some embodiments of the present invention, synthetic data can be used to build an initial machine learning model whose architecture (weights, connections, etc.) can be further fine-tuned based on its performance with real data. Secondly, in some embodiments of the present invention, when more real data becomes available, this can be used to generate synthetic data with higher correctness given its gaussian distribution and considering what the central limit theorem establishes. Thirdly, in some embodiments of the present invention, the processing and transformations performed on the real data in the process of generating the synthetic data gives the user a greater understanding of the nature and structure of the data. Some embodiments of the present invention that this advancement in the understanding of the real data can become a critical element in developing machine learning models more quickly once the complete real dataset is made available to the development team.

In the following section the steps to generate and evaluate the correctness of the synthetic data are described for some embodiments of the present invention.

Some embodiments of the present invention involve the generation of synthetic data and evaluating its correctness with respect to a real data sample input, allowing an initial machine learning model/architecture to be developed and reducing its modelling time. The steps of the methodology are listed below.

In some embodiments of the present invention a small sample data (arrived from a collected file or queried from a private cloud or database server) is aggregated, using a primary key, across the instance labels of the input data. In some embodiments of the present invention in the absence of such labels or highly overlapping classes, a clustering step is applied to assign initial labels to the data.

In some embodiments of the present invention for each of the data instance groups (clusters/classes) identified above, the mean and covariance matrix of each of their numerical variable/fields is computed.

In some embodiments of the present invention a total of N synthetic records is generated for each of the groups of real records. In some embodiments of the present invention the data instances are generated using the corresponding multivariate Gaussian distribution described by the mean vector and covariance matrix calculated above.

In some embodiments of the present invention a "True" label is assigned to the real-data (small) sample of records and a "False" label is assigned to the synthetically generated data records.

In some embodiments of the present invention a binary classifier is trained and tested in a supervised fashion using the "True" and "False" records across the total number of data features contained in the original real-data sample.

In some embodiments of the present invention, where the Area Under Curve (AUC) of the Receiver Operating Characteristic Curve (ROC) is higher than 0.6, reject the statistical assumptions made from the data in terms of number of classes in the data "N". In some embodiments of the present invention the synthetic data is not considered statistically consistent (correct enough) to the initial sample of real-data and the process of synthetic data generation is re-run to produce a new data label aggregation (False/True) with a different number of clusters. In some embodiments of the present invention if instead the value is lower than 0.6, accept the simulation and the synthetic data generated as statistically consistent (correct enough) to the initial real-data sample.

Some embodiments of the present invention recognize that once the synthetic data simulation is accepted it is possible to control the number of synthetic data records generated based on the Gaussian-statistical assumptions considered and that measured the highest level of data correctness. Some embodiments of the present invention recognize that the synthetic data can be now used in a "real-data" standard machine learning pipeline to initiate the model development regardless the existing severe constrains in data availability.

Figure 3:
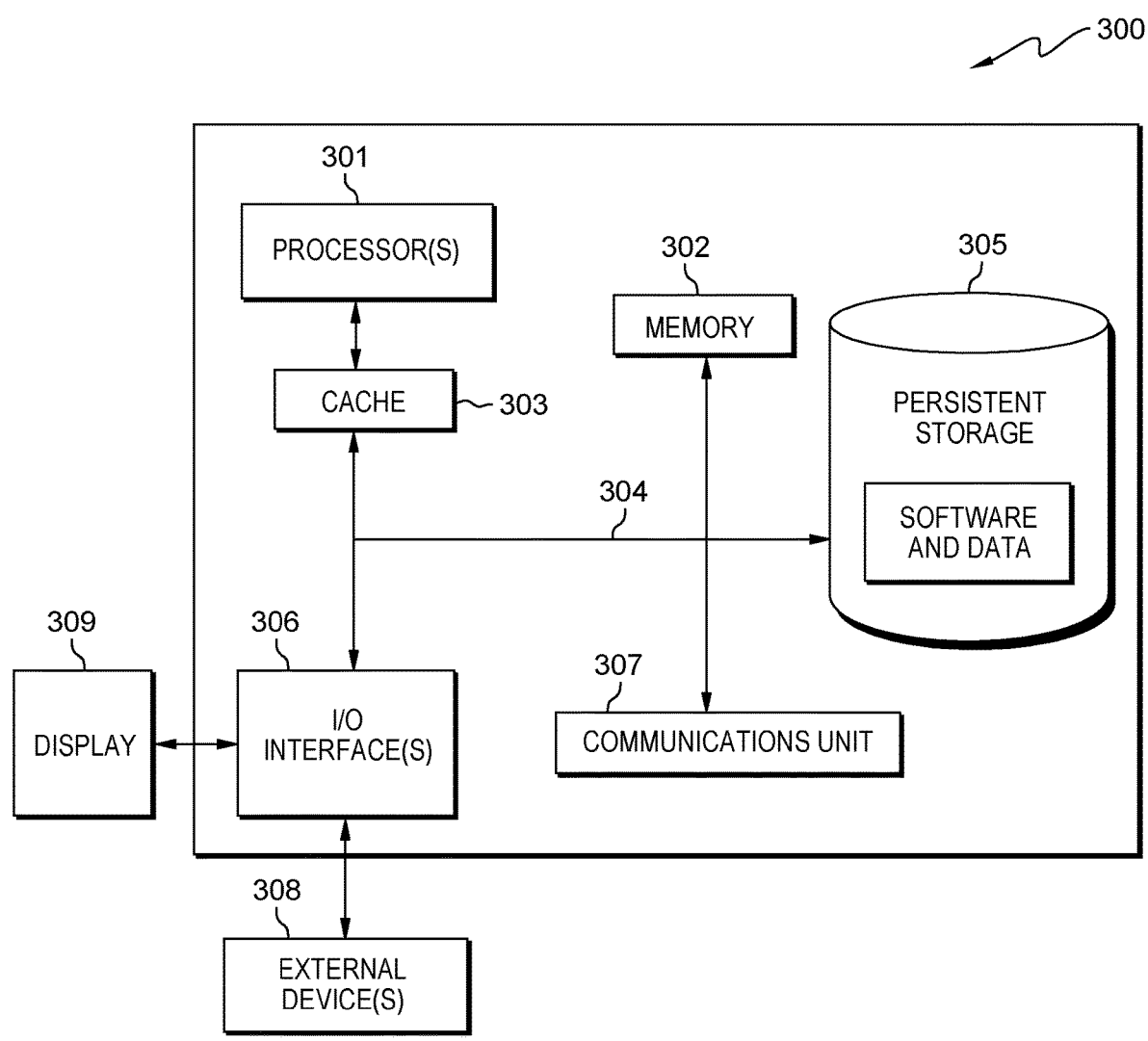
FIG. 3 is a block diagram of components of the server computer, in accordance with an embodiment of the present invention.

FIG. 3 depicts a block diagram of components of server computer 120 in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Server computer 120 each include communications fabric 304, which provides communications between cache 303, memory 302, persistent storage 305, communications unit 307, and input/output (I/O) interface(s) 306. Communications fabric 304 can be implemented with any architecture designed for passing data and/or control information between processors (such as microprocessors, communications, and network processors, etc.), system memory, peripheral devices, and any other hardware components within a system. For example, communications fabric 304 can be implemented with one or more buses or a crossbar switch.

Memory 302 and persistent storage 305 are computer readable storage media. In this embodiment, memory 302 includes random access memory (RAM). In general, memory 302 can include any suitable volatile or non-volatile computer readable storage media. Cache 303 is a fast memory that enhances the performance of computer processor(s) 301 by holding recently accessed data, and data near accessed data, from memory 302.

Program 150 may be stored in persistent storage 305 and in memory 302 for execution by one or more of the respective computer processor(s) 301 via cache 303. In an embodiment, persistent storage 305 includes a magnetic hard disk drive. Alternatively, or in addition to a magnetic hard disk drive, persistent storage 305 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 305 may also be removable. For example, a removable hard drive may be used for persistent storage 305. Other examples include optical and magnetic disks, thumb drives, and smart cards that are inserted into a drive for transfer onto another computer readable storage medium that is also part of persistent storage 305.

Communications unit 307, in these examples, provides for communications with other data processing systems or devices. In these examples, communications unit 307 includes one or more network interface cards. Communications unit 307 may provide communications through the use of either or both physical and wireless communications links. Program 150 may be downloaded to persistent storage 305 through communications unit 307.

I/O interface(s) 306 allows for input and output of data with other devices that may be connected to server computer 120. For example, I/O interface(s) 306 may provide a connection to external device(s) 308, such as a keyboard, a keypad, a touch screen, and/or some other suitable input device. External devices 308 can also include portable computer readable storage media such as, for example, thumb drives, portable optical or magnetic disks, and memory cards. Software and data used to practice embodiments of the present invention, e.g., program 150, can be stored on such portable computer readable storage media and can be loaded onto persistent storage 305 via I/O interface(s) 306. I/O interface(s) 306 also connect to a display 309.

Display 309 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, conventional procedural programming languages, such as the "C" programming language or similar programming languages, and quantum programming languages such as the "Q" programming language, Q#, quantum computation language (QCL) or similar programming languages, low-level programming languages, such as the assembly language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures (i.e., FIG) illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

Figure 4:
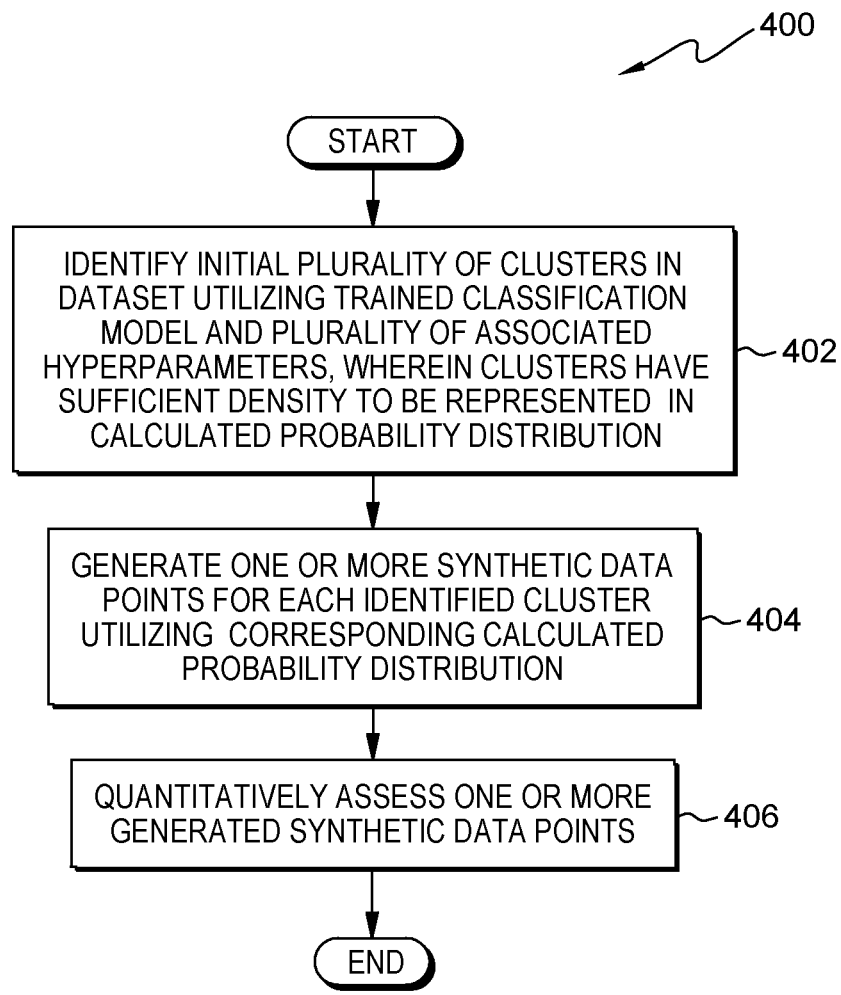
FIG. 4 is a flowchart depicting operational steps of a program, on a server computer within the computational environment of FIG. 1, for generating quatitatively assesed synthetic training data, in accordance with an embodiment of the present invention.

FIG. 4 is a flowchart depicting operational steps of program 150 for generating quantitatively assessed synthetic training data, in accordance with an embodiment of the present invention. Program 150 identifies a plurality of clusters in dataset utilizing trained classification model and plurality of associated hyperparameters, wherein clusters have sufficient density to be represented in calculated probability distribution (step 402). Program 150 generates one or more synthetic data points for each identified cluster utilizing corresponding calculated probability distribtution (step 404). Program 150 quantitatively accesses one or more generated synthetic data points (step 406).

What is claimed is:

1. A computer-implemented method comprising:
   identifying, by one or more computer processors, an initial plurality of clusters in a dataset utilizing a trained classification model and a plurality of associated hyperparameters, wherein the clusters have sufficient density to be represented in a calculated probability distribution;
   generating, by one or more computer processors, one or more synthetic data points for each identified cluster utilizing a corresponding calculated probability distribution; and
   quantitatively assessing, by one or more computer processors, the one or more generated synthetic data points.

2. The method of claim 1, wherein quantitatively assessing the one or more generated synthetic data points comprises:
   calculating, by one or more computer processors, an area under the receiver operating characteristic curve (AUROC) utilizing the dataset and the one or more generated synthetic data points; and
   responsive to the calculated AUROC not exceeding an AUROC threshold, initiating, by one or more computer processors, a model development, wherein the model development allows a real-time ingesting of synthetic data points and real data points.

3. The method of claim 2, further comprising:
   responsive to the calculated AUROC exceeding an AUROC threshold, tuning, by one or more computer processors, the plurality of associated hyperparameters of the trained classification model;
   identifying, by one or more computer processors, a subsequent plurality of clusters in the dataset utilizing the trained classification model and a plurality of tuned associated hyperparameters; and generating, by one or more computer processors, one or more synthetic data points for each cluster of the subsequently identified plurality of clusters utilizing the corresponding calculated probability distribution.

4. The method of claim 1, further comprising:
calculating, by one or more computer processors, the probability distribution utilizing a covariance matrix calculated for each cluster of the subsequently identified plurality of clusters.

5. The method of claim 4, wherein the probability distribution is a Gaussian distribution.

6. The method of claim 5, further comprising:
calculating, by one or more computer processors, a mean vector and the covariance matrix for each cluster of the subsequently identified plurality of clusters; and
generating, by one or more computer processors, the Gaussian distribution utilizing the calculated mean vector and the calculated covariance matrix for each cluster of the subsequently identified plurality of clusters.

7. The method of claim 1, where the trained classification model is a binary classifier.

8. The method of claim 2, wherein initiating the model development, comprises:
creating, by one or more computer processors, one or more mixed datasets that contain the real data points and the synthetic data points, wherein the synthetic data points are statistically indistinguishable from the real data points.

9. The method of claim 8, further comprising:
training, by one or more computer processors, one or more models utilizing the created mixed datasets; and
deploying, by one or more computer processors, the trained one or more models to one or more environments.

10. A computer program product comprising:
one or more computer readable storage media and program instructions stored on the one or more computer readable storage media, the stored program instructions comprising:
program instructions to identify an initial plurality of clusters in a dataset utilizing a trained classification model and a plurality of associated hyperparameters, wherein the clusters have sufficient density to be represented in a calculated probability distribution;
program instructions to generate one or more synthetic data points for each identified cluster utilizing a corresponding calculated probability distribution; and
program instructions to quantitatively assess the one or more generated synthetic data points.

11. The computer program product of claim 10, wherein the program instructions to quantitatively assessing the one or more generated synthetic data points, comprise:
program instructions to calculate an area under the receiver operating characteristic curve (AUROC) utilizing the dataset and the one or more generated synthetic data points; and
program instructions to, responsive to the calculated AUROC not exceeding an AUROC threshold, initiate a model development, wherein the model development allows a real-time ingesting of synthetic data points and real data points.

12. The computer program product of claim 11, wherein the program instructions, stored on the one or more computer readable storage media, comprise:

program instructions to, responsive to the calculated AUROC exceeding an AUROC threshold, tune the plurality of associated hyperparameters of the trained classification model;
program instructions to identify a subsequent plurality of clusters in the dataset utilizing the trained classification model and a plurality of tuned associated hyperparameters; and
program instructions to generate one or more synthetic data points for each cluster of the subsequently identified plurality of clusters utilizing the corresponding calculated probability distribution.

13. The computer program product of claim 10, wherein the program instructions, stored on the one or more computer readable storage media, comprise:
program instructions to calculate the probability distribution utilizing a covariance matrix calculated for each cluster of the subsequently identified plurality of clusters.

14. The computer program product of claim 13, wherein the probability distribution is a Gaussian distribution.

15. The computer program product of claim 14, wherein the program instructions, stored on the one or more computer readable storage media, comprise:
program instructions to calculate a mean vector and the covariance matrix for each cluster of the subsequently identified plurality of clusters; and
program instructions to generate the Gaussian distribution utilizing the calculated mean vector and the calculated covariance matrix for each cluster of the subsequently identified plurality of clusters.

16. A computer system comprising:
one or more computer processors;
one or more computer readable storage media; and
program instructions stored on the computer readable storage media for execution by at least one of the one or more processors, the stored program instructions comprising:
program instructions to identify an initial plurality of clusters in a dataset utilizing a trained classification model and a plurality of associated hyperparameters, wherein the clusters have sufficient density to be represented in a calculated probability distribution;
program instructions to generate one or more synthetic data points for each identified cluster utilizing a corresponding calculated probability distribution; and
program instructions to quantitatively assess the one or more generated synthetic data points.

17. The computer system of claim 16, wherein the program instructions to quantitatively assessing the one or more generated synthetic data points, comprise:
program instructions to calculate an area under the receiver operating characteristic curve (AUROC) utilizing the dataset and the one or more generated synthetic data points; and
program instructions to, responsive to the calculated AUROC not exceeding an AUROC threshold, initiate a model development, wherein the model development allows a real-time ingesting of synthetic data points and real data points.

18. The computer system of claim 17, wherein the program instructions, stored on the one or more computer readable storage media, comprise:

program instructions to, responsive to the calculated AUROC exceeding an AUROC threshold, tune the plurality of associated hyperparameters of the trained classification model;

program instructions to identify a subsequent plurality of clusters in the dataset utilizing the trained classification model and a plurality of tuned associated hyperparameters; and program instructions to generate one or more synthetic data points for each cluster of the subsequently identified plurality of clusters utilizing the corresponding calculated probability distribution.

19. The computer system of claim 16, wherein the program instructions, stored on the one or more computer readable storage media, comprise:

program instructions to calculate the probability distribution utilizing a covariance matrix calculated for each cluster of the subsequently identified plurality of clusters.

20. The computer system of claim 19, wherein the probability distribution is a Gaussian distribution.

* * * * *